United States Patent [19]

Tsubuko et al.

[11] 4,081,391
[45] Mar. 28, 1978

[54] LIQUID DEVELOPER FOR USE IN ELECTROPHOTOGRAPHY

[75] Inventors: Kazuo Tsubuko; Tsuneo Kurotori; Taro Kimura; Toshiyuki Kawanishi; Yoshikazu Kaneko, all of Tokyo, Japan

[73] Assignee: Ricoh Co., Ltd., Tokyo, Japan

[21] Appl. No.: 608,832

[22] Filed: Aug. 29, 1975

[30] Foreign Application Priority Data

Sep. 3, 1974 Japan ............................. 49-100590

[51] Int. Cl.$^2$ ................................................. G03G 9/12
[52] U.S. Cl. .............................. 252/62.1 L; 96/1 LY; 260/28.5 R; 260/885; 427/15; 427/17
[58] Field of Search ................... 252/621 L; 260/833, 260/885, 28.5 R; 96/1 LY; 427/15, 17; 526/12

[56] References Cited

U.S. PATENT DOCUMENTS

| | | | |
|---|---|---|---|
| 2,891,911 | 6/1959 | Mayer | 252/62.1 L |
| 3,105,821 | 10/1963 | Johnson | 252/62.1 L |
| 3,585,140 | 6/1971 | Machida et al. | 252/62.1 L |
| 3,623,986 | 11/1971 | Machida et al. | 252/62.1 L |
| 3,639,244 | 2/1972 | Machida et al. | 252/62.1 L |
| 3,657,130 | 4/1972 | Machida et al. | 252/62.1 L |
| 3,900,412 | 8/1975 | Kosel | 252/62.1 L |
| 3,997,488 | 12/1976 | Tsubuko et al. | 260/28.5 R |

*Primary Examiner*—Ralph S. Kendall
*Assistant Examiner*—John D. Smith
*Attorney, Agent, or Firm*—Blanchard, Flynn, Thiel, Boutell & Tanis

[57] ABSTRACT

This invention provides a liquid developer for use in electrophotography which comprises a dispersion of toner particles in a carrier liquid having a high resistivity and a low dielectric constant and is superior in fixability, dispersion stability and redispersability, said toner particles consisting essentially of pigment or dye particles and a non-aqueous dispersion of thermoplastic resinous composition comprising a graft-copolymer and at least one substance selected from wax the groups consisting of polyethylene.

5 Claims, No Drawings

LIQUID DEVELOPER FOR USE IN ELECTROPHOTOGRAPHY

BACKGROUND OF THE INVENTION a. Field of the Invention

The present invention relates to a liquid developer for use in electrophotography which is prepared by uniformly dispersing a toner consisting essentially of pigment or dyestuff and non-aqueous resinous composition in a carrier liquid having a high insulating property and a low dielectric constant.

b. Description of the Prior Art

Conventional liquid developers for use in electrophotography are generally prepared by dispersing a toner consisting essentially of pigment such as carbon black or dyestuff and synthetic or natural resin such as acrylic resin, phenol-modified alkyd resin, steberite resin, polymerized rosin and synthetic rubber, admixed with a polarity-controlling agent such as lecithin, metallic soap, linseed oil and higher fatty acid, in a carrier liquid having a high insulating porperty and a low dielectric constant such as a petroleum-type aliphatic hydrocarbon. In the early stages following their manufacture, the resin in the toner adheres to the pigment or dyestuff and the toner not only maintains a distinct positive or negative polarity but also retains uniform dispersion stability. Such a toner undergoes electrophoresis according to the electric charge of the electrostatic latent image formed on the sensitive surface of a photosensitive material in the development process and is fixed thereon to form a copied image, but it is defective in that the resin and the polarity-controlling agent therein gradually diffuse in the carrier liquid with the passing of time, so that the polarity becomes indistinct and finally there occurs coagulation, resulting in a lowering of the fixing efficiency and the formation of an opaque or indistinct copied image. Moreover, the conventional toner is incapable of re-dispersion once it coagulates, and accordingly reuse thereof has not been feasible.

SUMMARY OF THE INVENTION

The present invention is intended to overcome the foregoing defects in the prior art and to provide a liquid developer for use in electrophotography which is superior in dispersion stability, fixability and re-dispersibility and is suitable for use as a toner for offset printing plates as well.

The present invention has been achieved as a result of examination of the kind and properties of resins — particularly the solubility thereof in carrier liquids — with a view to ensuring stable dispersibility and polarity controlling effect of pigment or dyestuff within a carrier liquid.

The present invention provides a liquid developer for use in electrophotography which comprises a dispersion of toner particles consisting essentially of pigment or dye particles and a resinous composition, in a carrier liquid having a high resistivity and a low dielectric constant, said composition comprising a non-aqueous dispersion prepared by carrying out successively the following four steps (a), (b), (c) and (d) in an organic solvent such as aliphatic hydrocarbon or halogenated aliphatic hydrocarbon, at an elevated temperature, adding wax having a softening point of 60° to 130° C of polyethylene in one of the four steps and then cooling the reaction product while stirring vigorously:

(a) copolymerizing a monomer having the formula (I):

wherein R is hydrogen or methyl and A is —COOC$_n$H$_{2n+1}$ or —OC$_n$H$_{2n+1}$, $n$ being an integer of 6 to 20, with at least one compound selected from the group consisting of unsaturated carboxylic acid, glycidyl acrylate and glycidyl methacrylate, (b) esterifying the copolymer obtained in the above step (a) with glycidyl acrylate or glycidyl methacrylate when said copolymer has been prepared by using unsaturated carboxylic acid or esterifying the copolymer obtained in the above step (a) with unsaturated carboxylic acid, when said copolymer has been prepared by using glycidyl acrylate or glycidyl methacrylate, (c) grafting the esterified copolymer obtained in the above step (b) with a monomer having a vinyl group, and then (d) polymerizing the graftpolymer obtained in the step (c) with at least one polar-compound selected from the group consisting of vinyl monomer having the formula (II), maleic acid, fumaric acid, allylamine, vinylamine, aroylalcohol, vinyl sulfonic acid and vinyl phosphate

wherein R is hydrogen or methyl, B is

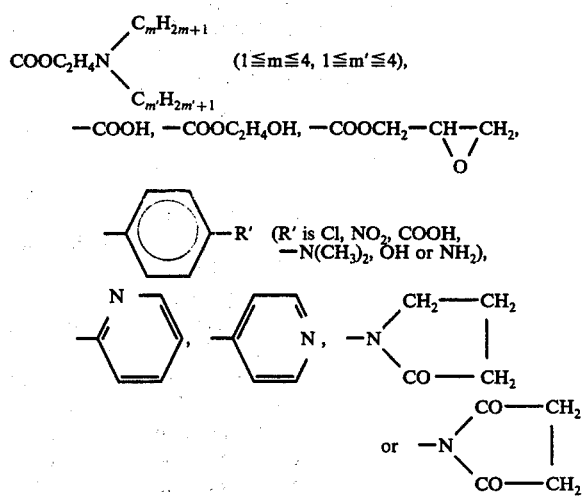

Further, the present invention provides a liquid developer for use in electrophotography which is prepared by combining the foregoing resinous dispersion with a copolymer of said polymerizable vinyl monomer and unsaturated carboxylic acid, glycidylacrylate or glycidylmethacrylate. As the copolymer for this purpose, a copolymer consisting of a monomer selected from the group consisting of styrene, methyl methacrylate and vinyl toluene and a monomer selected from the group consisting of acrylic acid, methacrylic acid, lauryl methacrylate, lauryl acrylate, stearyl acrylate, stearyl methacrylate, hydroxy ethyl acrylate, hydroxy ethyl methacrylate, 2-ethyl hexyl acrylate and 2-ethyl hexyl methacrylate as mixed at the molar ratio of 3/7 to 7/3 is appropriate. The appropriate amount of this copolymer to be applied is in the range of from 1 to 40 parts by weight, per 100 parts by weight of the resinous dispersion. By virtue of thus combining a specific copolymer with the resinous dispersion, the liquid developer according to the present invention can display the effect of conspicuously preventing the adhesion of toner to the cleaning means of type copying apparatus employed.

The present liquid developer has such merits as follows:

(1) Because plenty of pigment or dyestuff particles adhere to the resinous dispersion, the particle size of the toner can be made uniform to be in the range of from 0.2 to 1.0 $\mu$, and copies produced by the use of this developer can be high in concentration of image.

(2) By virtue of the adsorption of the polar polymer, the stability of the toner can be maintained for a long period of time (i.e., more than 10 months).

(3) While a relatively large quantity of the resinous dispersion adheres to the surfaces of the pigment or dyestuff particles, a small quantity of the resinous dispersion is free in the carrier liquid, and inasmuch as said resinous dispersion per se also migrates, the fixability of the image is satisfactory.

(4) The toner has a sufficient oleophilic property, so that, when it is utilized as a toner for printing plates, prints having an image of high concentration can be obtained.

(5) In electrostatic transfer, pressure transfer, magnetic transfer, etc., this developer displays a superior transferability toward the material whereon the transfer is to be effected. This is ascribable to the employment of wax or polyethylene, which displays high electric resistance, for the toner, as verified by the fact that it showed a satisfactory transfer coefficient even when the charged voltage was low at the time of transfer in the electrostatic transfer process.

The process of preparing a non-aqueous dispersion of the thermoplastic resinous composition used in this invention will be described in detail below:

The reaction of the step (a) is carried out by heating a mixture of a monomer of the formula (I) and one compound selected from the group consisting of unsaturated carboxylic acid, glycidyl acrylate and glycidyl methacrylate, at a temperature of 70° to 150° C in an aliphatic hydrocarbon or halogen derivative thereof in the presence of a polymerization catalyst such as azo-bis-isobutyronitrile. In this case, the suitable ratio of the monomer of the formula (I) to unsaturated carboxylic acid, glycidyl acrylate or glycidyl methacrylate is in the range of 99.9–80 to 0.1–20 by weight. Typical monomers of the formula (I) include lauryl, 2-ethylhexyl, stearyl or vinylstearyl, acrylates or methacrylates. The unsaturated carboxylic acids, that copolymerize with the monomer having the formula (I), include acrylic acid, methacrylic acid, fumaric acid, crotonic acid, itaconic acid, maleic acid, etc.

The reaction of the step (b) is carried out by adding a monomer as mentioned above to the reaction mixture obtained in the step (a) and heating the mixture at a temperature of 30° to 120° C in the presence of a esterification catalyst such as pyridine or lauryldimethylamine. Said monomer is used in an amount of 0.1–20 parts based on 100 parts by weight of the copolymer obtained in the step (a).

The reaction of the step (c) is carried out by adding a monomer as mentioned above to the reaction mixture obtained in the step (b) and heating the mixture at a temperature of 70° to 150° C in the presence of a catalyst such as benzoyl peroxide or azo-bis-isobutyronitrile. Said monomer is used in an amount of 5–100 parts based on 100 parts by weight of the esterified copolymer obtained in the step (b). Typical monomer having a vinyl group include acrylic acid, methacrylic acid, a lower alkyl ester of acrylic acid, methacrylic acid, styrene, methylstyrene and vinyl acetate. The lower alkyl ester of acrylic acid or methacrylic acid used in this step (c) is methyl, ethyl, propyl or butyl acrylate or methacrylate.

Next, the step (d) is carried out by adding 0.1 to 20 parts by weight of a polar compound to 100 parts by weight of the graft copolymer obtained in the step (c) and effecting reaction within the reaction mixture of (d) by heating at a temperature in the range of from 70° to 150° C. Through this reaction, the polar compound is polymerized and bonded to the graft portion of the graft-copolymer of (c) to form a polar group.

In the present invention, reaction is effected upon adding wax having a softening point in the range of from 60° to 130° C or polyethylene in any one of the afore-mentioned steps — preferably in the step (c) — and completely dissolving the mixture in a non-aqueous solvent. To cite the applicable non-aqueous solvent, there are n-hexane, n-pentane, isooctane, commercial aliphatic hydrocarbons like Isopar H, G, L and K or halogen derivatives thereof such as carbon tetrachloride and perchloroethylene. These non-aqueous solvents are supposed to be heated at the time of effecting the reaction, but if the temperature for heating is below the softening point of wax or polyethylene, said mixture will fail to be dissolved. In this case, it is necessary to heat the solvent further to raise the temperature above said softening point. Further, the appropriate amount of wax or polyethylene to be applied is in the range of from 5 to 50 parts by weight, per 100 parts by weight of the mixture of monomer I and unsaturated carboxylic acid or glycidyl acrylate and/or glycidyl methacrylate in the step a, from 5 to 50 parts by weight per 100 parts by weight of the copolymer in the step (b), from 1 to 40 parts by weight per 100 parts by weight of the esterified copolymer in the step (c), and from 5 to 50 parts by weight per 100 parts by weight of the graft-copolymer in the step (d). In this connection, whichever step it may be applied to, wax or polyethylene per se will not participate in the reaction and not have any substantial influence upon the quality of the non-aqueous thermoplastic resin as the final product, but it is preferable to apply it to the step (c) from the view point of enhancement of the degree of esterification and the rate of graft-polymerization.

As the wax or polyethylene for use in the present invention, ones having a softening point in the range of from 60° to 130° C are suitable; in the case where the softening point is less than 60° C, wax or polyethylene is hard to be separated and a satisfactory dispersion can not be obtained, while in the case where the softening point exceeds 130° C, wax or polyethylene is hard to dissolve in a heated non-aqueous solvent.

These waxes or polyethylenes have properties closely resembling said non-aqueous solvent in respect of specific gravity.

Next, in the present invention, after completion of the step (d), the reaction mixture is cooled, thereby making the wax or polyethylene dissolved therein separate in the form of fine particles. The size of these particles in the dispersion can be varied by changing the kind and concentration of wax or polyethylene or the conditions for stirring, cooling, etc. In general, in the case when a solution having a low concentration of wax or polyethylene such as a dilute solution containing 1 to 10% wax or polyethylene is quenched, there are obtained fine particles having mean particle size of 0.1 to 0.3μ, while in the case where a concentrated solution containing, for instance, 20 to 50% wax or polyethylene is cooled gradually, there are obtained large-sized particles of about 0.5 to 20μ. Accordingly, in order to obtain fine particles, quenching is preferable.

Wax having a softening point of 60° to 130° C or polyethylene are commercially available. Manufacturers, trademarks and softening points are listed below:

| Manufacturer | Trademark | Softening point (° C) |
|---|---|---|
| (1) Polyethylene | | |
| Union Carbide Corp. | DYNF | 102 |
| | DYNH | 102 |
| | DYNI | 102 |
| | DYNJ | 102 |
| | DYNK | 102 |
| Du Pont Co. Inc. | Alathon-3 | 103 |
| | Alathon-10 | 96 |
| | Alathon-12 | 84 |
| | Alathon-14 | 80 |
| | Alathon-16 | 95 |
| | Alathon-20 | 86 |
| | Alathon-22 | 84 |
| | Alathon-25 | 96 |
| Monsanto Co. | Orizon-805 | 116 |
| | Orizon-705 | 116 |
| | Orizon-50 | 126 |
| Philips Electronics Industrial Corp. | Marlex 1005 | 92 |
| (2) Polyethylene wax | | |
| Sanyo Kasei Kagaku-Kogyo K.K. | Sanwax-131P | 108 |
| | Sanwax-151P | 107 |
| | Sanwax-161P | 111 |
| | Sanwax-165P | 107 |
| | Sanwax-171P | 105 |
| | Sanwax-E200 | 95 |
| (3) Paraffin wax | | |
| Junsei Yakuhin K.K. | Paraffin Wax | 60–95 |
| (4) Beeswax | | |
| Kobayashi Kakoh K.K. | Sarashi Beeswax | 65 |
| | Setanol | 80 |
| Nagai Kokoh K.K. | Sarashi Beeswax | 65 |
| Seitetsu Kagaku K.K. | Flohsen | 110 |

Hereunder will be given some examples for the preparation of a non-aqueous resinous dispersion used in the present invention.

PREPARATION EXAMPLE 1.

300 g of Isopar G (a product of ESSO Standard Oil Co.) were put in a receptacle equipped with a stirrer, a thermometer and a reflux condensor, and heated up to a temperature of 95° C. Subsequently, after adding thereto a mixture consisting of 200 g of 2-ethyl hexyl methacrylate, 10 g of glycidyl methacrylate and 3 g of azo-bis-isobutyronitrile by dropping at a constant rate over a 3-hour period, additional stirring was conducted for 1 hour in order to complete the reaction. After that, 5 g of acrylic acid, 0.1 g of hydroquinone and 1 g of lauryl dimethylamine were added to the reaction mixture to make react therewith at a temperature of 90° C for 15 hours, and then the resultant copolymer was esterified. The degree of esterification on this occasion was in the range of from 25 to 30% as a result of measurement of the reduction of acid value. Next, upon adding 500 g of Isopar G to the thus esterified reaction mixture and then adding a mixture consisting of 50 g methyl methacrylate and 3 g of azo-bis-isobutyronitrile thereto by dropping at constant rate over a 3-hour period at a temperature of 90° C, the reaction mixture was further maintained at said temperature for about 5 hours in order to complete the reaction. Further, after adding 300 g of Isopar G to 300 g of the product from this reaction, 50 g of polyethylene (Orizon 805, a product of Monsanto Chemical Co.) were added thereto while heating the mixture at a temperature of 90° C, and the heating was continued for one hour until the mixture became transparent.

Next, 10 g of vinyl pyridine and 1 g of azo-bis-isobutyronitrile were added to a solution of the thus prepared graftcopolymer containing polyethylene and reaction was effected for 3 hours at a temperature of 90° C. When the resultant resinous solution was quenched with service water while stirring, it became a milky dispersion comprising 18.0% of solids having mean particle size of 0.3 to 1μ.

PREPARATION EXAMPLE 2.

Except for employing maleic acid in lieu of the acrylic acid used in Preparation Example 1 for the purpose of esterification of 2-ethyl hexyl methacrylate - glycidyl methacrylate copolymer, following the same procedure as in Example 1, a dispersion was prepared.

PREPARATION EXAMPLE 3.

400 g of isooctane were put in the same reactor as used in Example 1 and heated up to a temperature of 95° C. Thereafter, a mixture solution consisting of 200 g of stearyl methacrylate, 10 g of glycidyl acrylate and 2 g of benzoyl peroxide was added thereto by dropping over a 1-hour period, followed by 3 hours' stirring at a temperature of 95° C in order to complete the reaction, whereby a copolymer was prepared. Then, by adding 1 g of lauryl dimethylamine, 3 g of methacrylic acid and 0.1 g hydroquinone to the reaction mixture, esterification reaction was effected for 10 hours at a temperature of 95° C. The degree of this esterification was 30%. Next, upon adding 600 g of isooctane to this reaction mixture, a mixture consisting of 60 g of styrene and 4 g of benzoyl peroxide was added thereto by dropping over a 3-hour period while maintaining the temperature of said reaction mixture at 95° C, and graft-polymerization reaction was further effected for 5 hours. After adding 200 g of isooctane and then adding 50 g of paraffin wax (softening point: 70°–72° C) at a temperature of 95° C to dissolve in the reaction product, reaction was further effected for 40 minutes at a temperature of 95° C. Subsequently, after effecting polymerization for 3 hours at a temperature of 95° C by adding 5 g of N-vinyl pyrrolidone and 1 g of benzoyl peroxide to this resinous solution, the reaction product was cooled with service water while stirring, whereby a dispersion comprising 20% of solids having mean particle size of 0.1 to 0.2μ was obtained.

PREPARATION EXAMPLE 4.

400 g of Isopar L were put in the same reactor as used in Example 1 and heated up to 90° C. Thereafter, a mixture solution consisting of 200 g of lauryl methacrylate, 3 g of crotonic acid and 1 g of benzoyl peroxide was added thereto by dropping over a 2-hour period, and reaction was completed by maintaining the same temperature as above for 3 hours. Subsequently, by adding 1 g of lauryl dimethylamine and 10 g of glycidyl methacrylate to the reaction mixture, esterification reaction was effected for 20 hours at a temperature of 90° C. The degree of esterification on this occasion was 50%. Next, by adding 600 g of Isopar L to this reaction mixture, heating it up to 90° C and adding 40 g of ethyl acrylate and 4 g of benzoyl peroxide thereto by dropping over a 3-hour period, reaction was further effected for 5 hours. Upon adding 200 g of Isopar L to 200 g of the product from this reaction, 20 g of polyethylene(-DYNH, a product of Union Carbide Co.) were added thereto at a temperature of 90° C to dissolve therein, and reaction was continuously effected for one hour. Subsequently, after effecting polymerization of the thus reacted solution for 4 hours at a temperature of 90° C by adding 3 g of nitrostyrene and 0.5 g of benzoyl peroxide thereto, the polymerized solution was cooled with service water while stirring, whereby a dispersion comprising 12.0% of solids having mean particle size of 0.3 to $0.5\mu$ was obtained.

PREPARATION EXAMPLE 5.

400 g of Isopar H were put in the same reactor as used in Example 1 and heated up to 85° C. Thereafter, a mixture solution consisting of 200 g of 2-ethyl hexyl methacrylate, 5 g of methacrylic acid and 3 g of azo-bis-isobutyronitrile was added thereto by dropping over a 2-hour period, and reaction was completed by maintaining the temperature at 85° C for another 2 hours. Subsequently, by adding 1 g of lauryl dimethylamine and 5 g of glycidyl acrylate to the reaction mixture, reaction was effected for 18 hours at a temperature of 85° C. The degree of esterification on this occasion was 50%. Next, after adding 400 g of Isopar H to this reaction product and heating it up to 90° C, by adding a mixture consisting of 30 g of vinyl acetate and 3 g of azo-bis-isobutyronitrile thereto by dropping over a 3-hour period, reaction was further effected for 5 hours. Then, upon adding 200 g of Isopar H to 200 g of the product from this reaction, 20 g of polyethylene (Alathon-12, a product of Du Pont Co.) were added thereto at a temperature of 85° C to dissolve therein, and reaction was effected for 1 hour. Further, after effecting polymerization of the thus reacted solution for 5 hours at a temperature of 85° C by adding 6 g of diethyl aminoethyl methacrylate and 0.5 g of azo-bis-isobutyronitrile thereto, the polymerized solution was cooled with service water while stirring, whereby a dispersion comprising 14.0% of solids having mean particle size of 0.6 to $0.9\mu$ was obtained.

PREPARATION EXAMPLE 6.

300 g of isooctane were put in the same reactor as used in Example 1 and heated up to 90° C. Thereafter, a mixture solution consisting of 200 g of 2-ethyl hexyl methacrylate, 10 g of glycidyl methacrylate and benzoyl peroxide was added thereto by dropping over a 2-hour period, and the foregoing temperature was further maintained for 4 hours in order to complete the reaction. Subsequently, by adding 1 g of lauryl dimethylamine, 3 g of maleic acid and 0.05 g of hydroquinone to the resulting copolymer solution, reaction was effected for 15 hours at a temperature of 90° C. The acid value of the reaction product on this occasion was 20. Next, after adding 520 g of isooctane to this reaction product, a mixture consisting of 40 g of vinyl toluene and 3 g of benzoyl peroxide was added thereto at a temperature of 90° C by dropping over a 3-hour period, and reaction was effected for 5 hours subsequent thereto. Then, upon adding 200 g of isooctane to 200 g of the product from this reaction and heating up to a temperature of 90° C, by adding 20 g of wax (QX Wax, a product of Quaker State Oil Co.) having a boiling point of 65° C to dissolve therein, reaction was effected for one hour. When 10 g of chlorostyrene and 0.5 g of benzoyl peroxide were added to the resulting reaction mixture, polymerization reaction was effected for 3 hours at a temperature of 90° C and the reaction product was quenched, there was obtained a dispersion comprising 30% of solids having mean particle size of $0.5\mu$.

PREPARATION EXAMPLE 7.

300 g of Isopar H were put in the same apparatus as used in Example 1 and heated up to 90° C. Thereafter, a mixture solution consisting of 200 g of stearyl acrylate, 20 g of glycidyl methacrylate and 3 g of azo-isobutyronitrile was added thereto by dropping over a 5-hour period. Subsequently, by adding 10 g of acrylic acid, 1 g of lauryl dimethylamine and 0.5 g of hydroquinone to the reaction mixture, esterification reaction was effected for 10 hours at a temperature of 90° C. Next, by adding 300 g of Isopar H and then adding a mixture consisting of 40 g of styrene monomer and 3 g of azo-bis-isobutyronitrile over a 3-hour period, reaction was continuously effected for 5 hours thereafter. Then, by adding 200 g of Isopar H and 40 g of polyethylene wax (SANWAX 171P, a product of SANYO KASEI K.K.) to the reaction mixture and dissolving therein at a temperature of 95° C, reaction was further effected for 1 hour. Next, this reaction mixture was polymerized for 3 hours at a temperature of 95° C by adding 10 g of hydroxyethyl methacrylate and 0.3 g of azo-bis-isobutyronitrile and thereafter was quenched while stirring. As a result, a dispersion comprising 15.5% of solids having mean particle size of 0.1 to $0.4\mu$ was separated.

In the case of a non-aqueous thermoplastic resinous dispersion (composition) prepared as above, as the specific gravity of the wax or polyethylene constituting the particle nuclei approximates the specific gravity of the dispersion medium (the specific gravity of the conventional acrylic resin, for instance, is in the range of from 1.1 to 1.2, while its counterpart of the present resinous dispersion is in the range of from about 0.85 to 1.05), it displays an excellent dispersion stability in a carrier liquid of the same kind as the dispersion medium. Besides, as it has a portion soluble in a carrier liquid, it scarcely gives rise to coagulation ascribable to deterioration with the passing of time; even if any coagulation takes place, no trouble will arise because of the superior redispersibility thereof. Further, this resinous dispersion shows distinct polarity in a carrier liquid by virtue of nuclei consisting of wax or polyethylene.

To give examples of pigment and dyestuff applicable to the present invention, there are conventional substances such as Alkali Blue, Phthalocyanine Green, Oil Blue, spirit black, carbon black, Oil Violet, Phthalocyanine Blue, Benzidine Yellow, Methyl Orange, Brilliant Carmine, Fast Red, Methyl Violet, etc.

As the carrier liquid suitable for use in the present invention, there are substances of the same kind as the foregoing non-aqueous solvent (providing that they should be paraffinic or isoparaffinic aliphatic hydrocarbon or halogen derivative thereof having electric resistance of more than $10^9 \Omega cm$ and a dielectric constant of less than 3), and to give examples of applicable commercial goods, there are Isopar E, G, H, L and K, Naphtha No. 6, Solvesso 150, Daifron, etc. Further, n-hexane, ligroin, n-heptane, 150-octane, N-octane, carbon tetrachloride, etc. are also applicable. These aliphatic hydrocarbons or halogen derivatives thereof are employed independently or in combination.

In order to prepare the liquid developer according to the present invention, it will do to disperse 0.1 to 1.0 part by weight of pigment (or dyestuff) together with a proper quantity of carrier liquid in 1 part by weight of a resin dispersion obtained as above by means of a dispersing machine like the ball-mill. In this case, a trace of polarity controlling agent may be added as occasion demands, but inasmuch as the resin dispersion according to the present invention is possessed of a strong polarity and is superior in dispersion stability as stated above, there is no particular necessity for adding any polarity controlling agent. In this connection, as the polarity controlling agent, any of the conventional ones is applicable.

In the following will be given examples embodying the present invention.

DESCRIPTION OF THE PREFERRED EMBODIMENTS

Example 1.

| | |
|---|---|
| dispersion-A (solid content: 18%) as obtained in preparation-1 | 50 g |
| Carbon Black Mitsubishi #100 (a product of MITSUBISHI CARBON K.K.) | 5 g |
| Special Black EB (a product of ORIENT KAGAKU K.K.) | 1 g |
| Isopar H | 100 g |

A mixture having the above composition was dispersed by means of a ball-mill for 40 hours to produce a concentrated toner, and 10 g of the thus obtained concentrated toner were dispersed in 2 l of Isopar H, whereby a liquid developer was prepared. Next, an electrostatic latent image was formed on a commercial electrophotographic copying paper (a zinc oxide~resin dispersion type copying paper) through the normal process. Subsequently, this latent image was developed with the foregoing developer, whereby there was obtained a copy having the concentration of image of 1.20 and improved fixability compared with a copy produced by the use of conventional developers. When a forced deterioration test was conducted at a temperature of 50° C for 7 days to examine the stability of the toner, there was observed little change from the state prior to the test.

Example 2.

| | |
|---|---|
| dispersion-B (solid content: 20%) as obtained in preparation-2 | 30 g |
| Carbon Black MITSUBISHI #44 | 10 g |
| Isopar H | 100 g |

A mixture having the above composition was dispersed by means of a ball-mill for about 40 hours to produce a concentrated toner, and 10 g of the thus obtained concentrated toner were dispersed in 2 l of Isopar H, whereby a liquid developer was prepared. Next, an electrostatic latent image was formed on a commercial electrophotographic copying paper through the normal process. Subsequently, this latent image was developed with the foregoing developer, whereby there was obtained a copy having the same quality as that in Example 1. Further, when this copy was desensitized and employed for printing as offset master, it brought about a clear-cut finish. Especially, because of the superior oleophilic property of the toner, ink spread well on the image area of the offset master and the concentration of the printed image area was more than 1.25. Also, because of the superior fixability of the toner onto the offset master, it was possible to produce as many as 30,000 prints. The stability of the developer was the same as in Example 1.

Example 3.

| | |
|---|---|
| dispersion-C (solid content: 12.0%) as obtained in preparation-4 | 50 g |
| Benzidine Yellow GY (a product of SANYO KASEI K.K.) | 10 g |
| Isopar G | 100 g |

A mixture having the above composition was dispersed by means of a ball-mill for 60 hours, whereby a green toner for use in coloring was prepared. As the dispersion-C used herein is fast adsorbed to Benzidine Yellow GY within the toner, it not only imparts an excellent luster and transparency to the toner image but also contributes to faithful reproduction of color.

Example 4.

| | |
|---|---|
| dispersion-D (solid content: 14%) as obtained in preparation-5 | 25 g |
| Microlith Blue (a product of CHIBA Co.) | 5 g |
| isooctane | 100 g |

A mixture having the above composition was dispersed by means of a ball-mill for 60 hours, whereby a cyan-colored toner for use in coloring was prepared. This toner, like the one in Example 3, has proved superior in respect of the transparency of toner, the luster of image and the reproduction of color. Besides, because of the superior fixability thereof, there hardly occurs abrasion on the image ascribable to the rubbing at the time of putting one color over another.

Example 5.

| | |
|---|---|
| dispersion-E (solid content: 15.5%) as obtained in preparation-7 | 50 g |
| Microlith Black CT (a product of CHIBA Co.) | 10 g |
| Isopar H | 100 g |

A mixture having the above composition was dispersed by means of a ball-mill for 24 hours, whereby a concentrated toner having negative polarity was prepared. Subsequently, by diluting 14 g of this toner with 4 l of Isopar H, a liquid developer was prepared. Next, an electrostatic latent image was formed on a commercial electrophotographic copying paper (namely, MRP-600 manufactured by K.K. RICOH), and said latent image was developed by the use of the foregoing liquid developer, whereby a distinct image could be reproduced.

Further, the re-dispersibility of this developer proved by far superior to that of conventional developers. To be precise, in the case of the developer according to the present invention, even when it was left standing for a week, there was scarcely observed any precipitation and it was possible to re-disperse it, while in the case of a conventional developer (namely, a toner for use in MRP-600, the manufacture of K.K. RICOH), there was brought about a large quantity of precipitate and yet re-dispersion was possible.

Example 6.

| | |
|---|---|
| dispersion-F (solid content: 30%) as obtained in preparation-6 | 50 g |
| tri-iron tetroxide | 10 g |
| Isopar G | 100 g |

A mixture having the above composition was dispersed by means of a ball-mill for 40 hours, whereby a toner for use in magnetic transfer was prepared. Next, after forming an electrostatic latent image on a commercial electrophotographic copying paper, said latent image was developed with the toner according to the present invention, a transfer paper was superposed thereon, and transfer was effected by means of a magnet by way of the side whereon said transfer paper was attached. As a result, about 80% of the toner image was transferred onto the transfer paper. Because of the specific gravity of tri-iron tetroxide being great, the toner was apt to precipitate, but even when the toner precipitated, re-dispersion was possible.

Example 7.

| | |
|---|---|
| dispersion-A (solid content: 18%) | 25 g |
| dispersion-B (solid content: 20%) | 25 g |
| Carbon Black MITSUBISHI #100 | 5 g |
| Microlith Blue (a product of CHIBA Co.) | 1 g |
| Isopar L | 100 g |

A mixture having the above composition was dispersed by means of a ball-mill for about 60 hours, whereby a toner having negative polarity for use in charge transfer was prepared. Next, after forming an electrostatic latent image on a selenium photosensitive plate, said latent image was developed with the toner according to the present invention, a transfer paper was superposed thereon and charge transfer was effected. As a result, the transfer ratio was about 78%, and the transferred image showed an excellent fixability.

Example 8.

| | |
|---|---|
| dispersion-E (solid content: 15.5%) | 30 g |
| dispersion-F (solid content: 30%) | 20 g |
| dyestuff PDB-11 (a product of MORIMURA KEMENARON K.K.) (Alkali Blue) | 10 g |
| Isopar G | 100 g |

A mixture having the above composition was dispersed by means of a ball-mill for about 24 hours, whereby a concentrated toner having negative polarity was prepared. Next, a liquid developer prepared by diluting 10 g of said concentrated toner with 2 l of Isopar G was put in the developing section of a commercial electrophotographic copying machine and development was effected. As a result, there was obtained an image superior in transferability as well as fixability.

Example 9.

| | |
|---|---|
| a) dispersion-C | 50 g |
| styrene/2-EHMA=5/5(60%) | |
| MA-11 (carbon, a product of MITSUBISHI CARBON K.K.) | 5 g |
| Isopar L | 100 g |
| b) dispersion-D | 50 g |
| vinyl toluene/2-EHMA=6/4(60%) | |
| Peerles-155 carbon (a product of COLUMBIA CARBON Co.) | 10 g |
| Alkali Blue | 1 g |
| Isopar H | 100 g |
| c) dispersion-E | 38 g |
| styrene/LMA=6/4(60%) | |
| Conductex SC (a product of COLUMBIA CARBON Co.) | 10 g |
| Reflex Blue (a product of Hochst GOSEI K.K.) | 8 g |
| Sobazol | 2 g |
| d) dispersion-F | 100 g |
| MMA/SMA=5/5(61%) | 50 g |
| Carbon Black MITSUBISHI #44 | 8 g |
| carbon tetrachloride | 4 g |
| e) dispersion-A | 160 g |
| Conductex SC | 50 g |
| Daifroil #100 (a product of DAIKIN KOGYO K.K.) | 3 g |
| | 80 g |

Mixtures having the compositions a) through e) above were respectively dispersed by means of a ball-mill for 24 hours, whereby 5 varieties of concentrated toners having negative polarity were prepared. Next, by diluting 14 g each of these toners in 4 l of the same solvent as used in said dispersions respectively, 5 varieties of liquid developers were prepared. When copying was conducted by the use of these developers in the same way as in Example 5, there was obtained a clear-out image respectively.

These developers not only proved superior in re-dispersibility but also were absolutely free of adhesion of toner onto the cleaning means of the copying apparatus employed. In this connection, in the foregoing compositions (a) through (e), 2-EHMA stands for 2-ethyl hexyl methacrylate, LMA stands for lauryl methacrylate, SMA stands for stearyl methacrylate, and HEMA stands for hydroxyethyl methacrylate.

What we claim is:

1. A liquid developer for use in electrophotography, consisting essentially of a toner dispersed in a carrier liquid having a high resistivity and a low dielectric constant, said toner having a mean particle size in the range of from 0.1 to 1 micron and consisting essentially of pigment or dye particles, a non-aqueous resin dispersion and an additive copolymer, said non-aqueous resin dispersion having been prepared by carrying out successively the following four steps (a), (b), (c) and (d) in an aliphatic hydrocarbon organic solvent or a halogenated aliphatic hydrocarbon solvent, at an elevated temperature, adding wax or polyethylene having a softening point of 60° to 130° C in one of the four steps and dissolving it in the solvent, and cooling the reaction product of step (d) while stirring vigorously:

(a) copolymerizing from 99.9 to 80 parts by weight of a monomer having the formula (I)

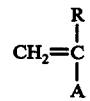

wherein R is hydrogen or methyl, A is $-COOC_nH_{2n+1}$ or $-OC_nH_{2n+1}$, and $n$ is an integer of from 6 to 20, with from 0.1 to 20 parts by weight of at least one comonomer selected from the group consisting of an unsaturated carboxylic acid, glycidyl acrylate and glycidyl methacrylate;

(b) esterifying 100 parts by weight of the copolymer obtained in step (a) with from 0.1 to 20 parts by weight of glycidyl acrylate or glycidyl acrylate when said copolymer has been prepared by using an unsaturated carboxylic acid, or esterifying 100 parts by weight of the copolymer obtained in step (a) with from 0.1 to 20 parts by weight of said unsaturated carboxylic acid when said copolymer has been prepared by using glycidyl acrylate or glycidyl methacrylate;

(c) grafting 100 parts by weight of the esterified copolymer obtained in step (b) with from 5 to 100 parts by weight of a monomer having a vinyl group;

(d) polymerizing 100 parts by weight of the graft copolymer obtained in step (c) with from 0.1 to 20 parts by weight of a compound selected from the group consisting of maleic acid, fumaric acid, allylamine, vinylamine, aroyl alcohol, vinyl sulfonic acid, vinyl phosphate and a vinyl monomer having the formula

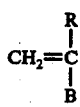

wherein R is hydrogen or methyl, and B is

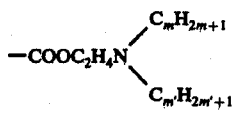

wherein m and m' are integers from one to 4,

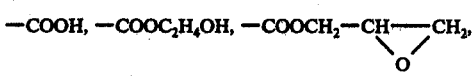

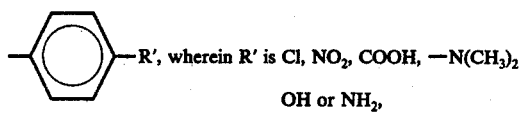

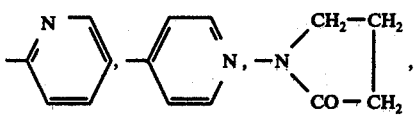

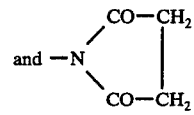

and wherein the amount of said wax or polyethylene added is as follows:

when added in step (a), from 5 to 50 parts by weight of said wax or polyethylene, per 100 parts by weight of the sum of the weights of said monomer (I) and said co-monomer, when added in step (b), from 5 to 50 parts by weight of said wax or polyethylene, per 100 parts by weight of the copolymer obtained in step (a), when added in step (c), from 1 to 40 parts by weight of said wax or polyethylene, per 100 parts by weight of the esterified copolymer obtained in step (b), and when added in step (d), from 5 to 50 parts by weight of said wax or polyethylene, per 100 parts by weight of the graft copolymer obtained in step (c), and said additive copolymer is a copolymer of a first monomer selected from the group consisting of styrene, methylmethacrylate and vinyl toluene, and a second monomer selected from the group consisting of acrylic acid, methacrylic acid, lauryl methacrylate, lauryl acrylate, stearyl acrylate, stearyl methacrylate, hydroxyethyl acrylate, hydroxyethyl methacrylate, 2-ethylhexylacrylate and 2-ethylhexyl methacrylate, copolymerized at a molar ration of 3/7 to 7/3, the amount of said additive copolymer being from one to 40 parts by weight, per 100 parts by weight of said resin dispersion.

2. A liquid developer as claimed in claim 1, in which said unsaturated carboxylic acid is selected from the group consisting of acrylic acid, methacrylic acid, fumaric acid, crotonic acid, itaconic acid and maleic acid.

3. A liquid developer as claimed in claim 2, in which said monomer having a vinyl group employed in step (c) is selected from the group consisting of acrylic acid, methacrylic acid, lower alkyl ($C_1$ to $C_4$) esters of acrylic acid or methacrylic acid, styrene, methylstyrene and vinyl acetate.

4. A liquid developer as claimed in claim 3, in which said wax or polyethylene is added in step (c).

5. A liquid developer as claimed in claim 3, in which said monomer having the formula (I) is selected from the group consisting of lauryl, 2-ethylhexyl, stearyl or vinylstearyl acrylates and methacrylates.

* * * * *